United States Patent [19]

Jacobs

[11] Patent Number: 4,684,013
[45] Date of Patent: Aug. 4, 1987

[54] AUTOMATIC LOADING TRAY FOR THIN-WALLED PLASTIC FLOWER POTS

[75] Inventor: Paul J. Jacobs, Moundsview, Minn.

[73] Assignee: T. O. Plastics, Inc., Minneapolis, Minn.

[21] Appl. No.: 858,565

[22] Filed: Apr. 24, 1986

Related U.S. Application Data

[63] Continuation of Ser. No. 649,953, Sep. 11, 1984, abandoned, which is a continuation-in-part of Ser. No. 538,514, Oct. 3, 1983, abandoned.

[51] Int. Cl.⁴ .................. B65D 85/50; B65D 1/34
[52] U.S. Cl. .................. 206/423; 206/560; 206/564; 220/23.8; 220/23.86
[58] Field of Search .............. 206/423, 560, 564, 563; 220/23.8, 23.83, 23.86

[56] References Cited

U.S. PATENT DOCUMENTS

| 1,780,422 | 11/1930 | Geiler | 220/23.8 |
| 3,115,266 | 12/1963 | Poupitch | 220/23.8 |
| 3,142,133 | 7/1964 | Brooks | 206/423 |
| 3,386,608 | 6/1968 | Diller | 220/23.8 |
| 3,441,173 | 4/1969 | Edwards | 206/520 |
| 3,660,934 | 5/1972 | Pollack et al. | 206/423 |
| 3,661,317 | 5/1972 | Noguchi | 229/2.5 EC |
| 3,759,413 | 9/1973 | Ardito | 220/23.8 |
| 3,844,525 | 10/1974 | Parmett | 220/23.8 |
| 3,982,655 | 9/1976 | Kaupert | 220/23.8 |
| 4,432,161 | 2/1984 | De Bruin | 206/425 |

FOREIGN PATENT DOCUMENTS 1464835  11/1966  France .................. 220/238

Primary Examiner—Joseph Man-Fu Moy
Attorney, Agent, or Firm—Jacobson and Johnson

[57] ABSTRACT

A thin relatively stiff but somewhat resilient sheet of plastic material is formed into a series of aligned, identically-shaped and dimensioned cavities for holding thin-walled plastic flower pots with the cavities having ribs formed on their inside surfaces and hand-access cutouts in their side walls. As an added feature, a skirt or flange for lifting and carrying the tray is provided and suitable drain holes may also be provided.

7 Claims, 3 Drawing Figures

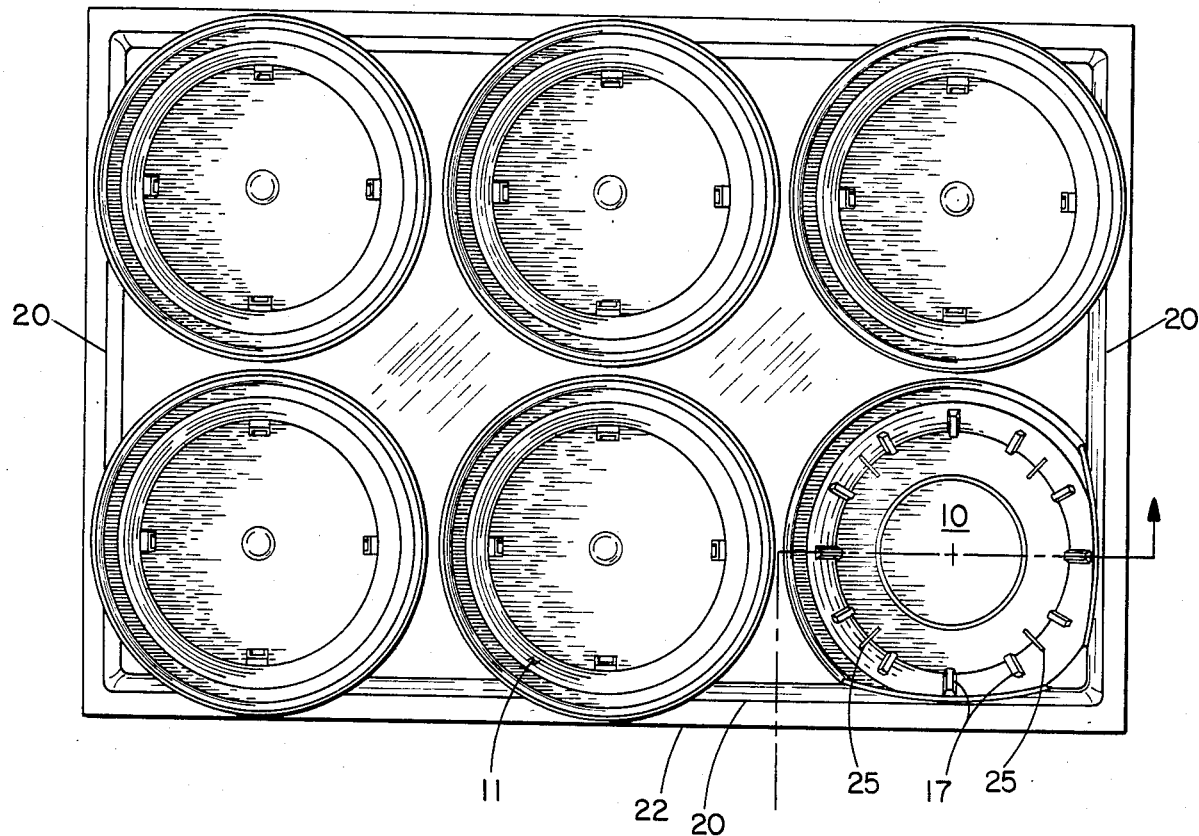
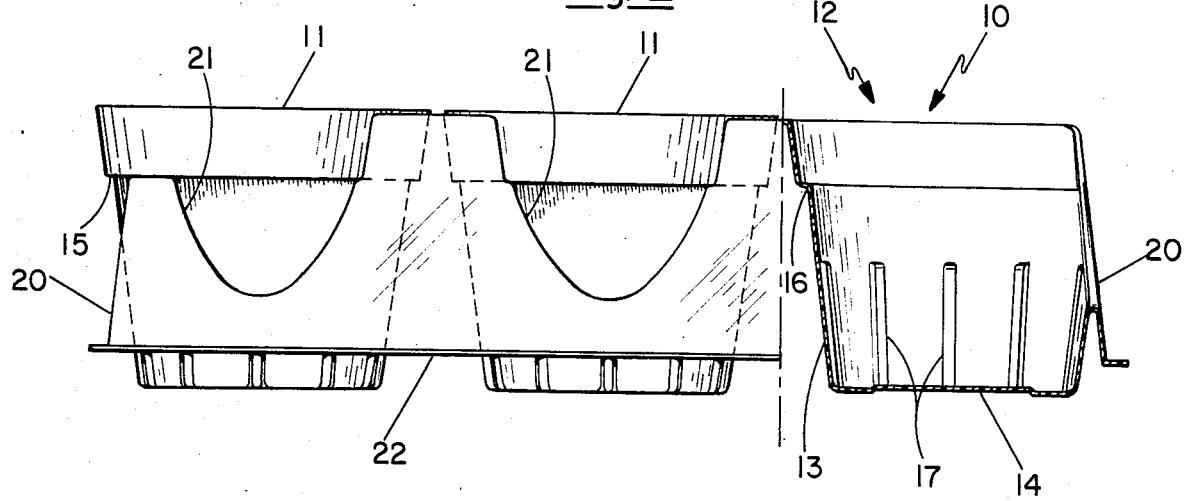

AUTOMATIC LOADING TRAY FOR THIN-WALLED PLASTIC FLOWER POTS

This application is a continuation of application Ser. No. 649,953, filed Sept. 11, 1984 which is a continuation-in-part of application Ser. No. 538,514 filed Oct. 3, 1983, both abandoned.

FIELD OF THE INVENTION

The instant invention is for use with thin plastic flower pots used in commercial wholesale greenhouses for growing, processing and distributing ornamental and floracultural plants. The invention is not intended for use with the conventional clay flower pots or heavy patio-type planters.

In present-day mechanized or automated operation of nurseries, the flower pots are generally carried on a conveyor belt past or under stations where soil, fertilizer, seeds or perhaps a plant is dropped or deposited into the flower pot and then the pot is carted away for further care, processing, shipment, storage or display. This invention is directed toward providing a tray in which thin-walled plastic flower pots, which can be made by vacuum forming or injection molding, are placed before being set on a conveyor belt or otherwise processed whereby a number of the flower pots can be filled and then carried away together for storage, shipment or display or further care.

DESCRIPTION OF THE PRIOR ART

Square or rectangular flower pots can be placed on a conveyor belt close to one another with little or no space in between so virtually all of the material falls into the flower pot with little falling in between. This is not the case with circular flower pots because of the open spaces between them. Further, it is easy to position square or rectangular flower pots on a conveyor belt for alignment with respect to the stations where material is deposited. This invention provides the same ease in aligning circular flower pots with respect to the various stations.

In addition, empty thin-walled plastic flower pots generally are shipped from the factory in stacks contained in large cartons or shipping containers and are removed individually from the cartons when ready to be placed on the conveyor line or used in some fashion. The tray constructed according to the teachings of this invention provides means whereby the operator can remove a single layer of a group of flower pots from the shipping container at one time thereby fully loading the tray and then placing the pot-filled tray on the conveyor belt for filling the pots or for other purposes. After filling the entire group of pots in the tray can then be removed from the conveyor belt at one time and carted away for storage, display, shipping or further care. In addition, the trays are constructed so that they will nest for convenient and efficient shipping. After use at a greenhouse they can be cleaned and again conveniently and efficiently stacked for storage awaiting re-use.

SUMMARY OF THE INVENTION

A thin sheet of some suitable material, preferably an inexpensive plastic, either by vacuum forming or by injection molding is formed into a series of cavities shaped and dimensioned to accept thin-walled plastic flower pots. After the flower pots are set in the cavities the tray can then be placed on a conveyor belt for filling and afterward carted away for storage, shipment or further care. The tray should be made of a material which, while relatively thin, is stiff enough to carry the filled flower pots yet at the same time the walls of the cavities should have some degree of resiliency so the tray can be utilized for removing the stacked flower pots from their shipping containers, as will be explained later. In the wall of each cavity is a cutout which provides finger access for removing the individual flower pots. In addition, each of the inner side walls of the cavities have ribs or flutes which space the flower pot from the inner surface of the tray cavity thereby making it easier to remove the flower pot, making it possible to load the tray with a layer of flower pots from their shipping container and providing an air space between the flower pot and the cavity wall for aeration or for warming the plant. Additionally, the flutes or ribs provide strength to the cavity walls yet retain the necessary resiliency. The tray is also provided with a flange or skirt for lifting and carrying the tray. As a special feature, the tray is constructed in a fashion such that one tray is nestable with another so the trays can be conveniently and efficiently stacked and stored when not in use. In general the tray is made from polystyrene having a thickness ranging from 0.040" to 0.075" and the flower pots are made from polystyrene, polypropylene or polyethylene ranging from 0.040" to 0.080" thickness.

BRIEF DESCRIPTION OF THE DRAWING

FIG. 1 is a top view of an embodiment of the invention having six pot-holding cavities for circular flower pots with five of the cavities containing pots and one cavity being empty;

FIG. 2 is a side view of the embodiment illustrated in FIG. 1 and is sectioned in part to show some of the details of the construction of the cavity.

DETAILED DESCRIPTION OF THE PREFERRED EMBODIMENT

Figure 3:
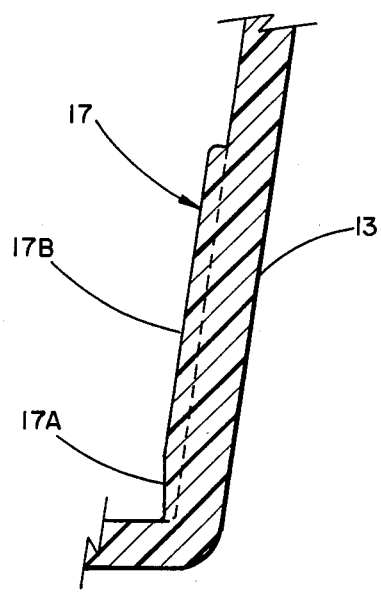
FIG. 3 is a section view showing in detail the construction of the ribs or flutes which provide a particular feature of the invention.

The illustrated embodiment contains a set of six cavities, generally designated by the reference numeral 10, arranged in centrally aligned rows (across the drawing) and columns (vertically in the drawing). While the illustrated embodiment shows six cavities for circular flower pots any suitable number can be utilized and the number of cavities is a matter of choice. As will be pointed out later in this description, there are certain factors which may affect the selection of the number of cavities in the tray. The invention has particular advantages for use with circular thinwalled plastic flower pots so will be described as used in that fashion. However, certain of the novel features are applicable equally to the square or rectangular pots. The cavities and the rest of the tray are thin walled and are made out of a suitable material, preferably a plastic material such as polystyrene, which, for example, might be in the order of about 0.040" to 0.075" thick. The type of material and the wall thickness is a matter of choice depending on the use but in any event, as stated before is clearly differentiated from the clay or heavy patio display pot. Certain characteristics which may affect the choice of the material and the wall thickness may be pointed out during the course of this description. Typically, no limitation thereto being intended, the trays may be made by thermal-vacuum forming or by injection molding.

In the example illustrated and described herein, the cavities 10 are formed and dimensioned to accept and hold circular flower pots 11 which may range widely in depth and in diameter. However, all the cavities in a given tray should be the same size. While referred to as circular flower pots, actually the top opening is circular and the side wall of the flower pot is generally frusto-conical, tapered inward and downward to the closed bottom. In a similar fashion then the cavity has a circular top opening 12 and side walls 13 which taper downwardly and inwardly generally to a closed bottom 14, although the bottom could be open. To accommodate square flower pots the tray cavities would have a square top opening and straight side walls which generally are somewhat tapered inwardly toward the bottom. The dimensions of the opening 12 and the depth of the cavity and the degree of taper depend upon the style and size of the flower pot with which the tray is going to be used. Generally speaking, the flower pots have a ledge or shoulder such as illustrated at 15 and similarly a shoulder 16 is provided in the wall of the cavity to accommodate the flower pot ledge 15.

On the inner surface of the cavities are a series of downward sloping flutes or ribs 17 which serve a number of purposes. For one, they space the outer wall of the flower pot 11 from the inner surface of the wall 13 of the cavity so that when the flower pot is nested in the cavity, it is easier to remove because the walls are not in snug engagement. For another, in some instances water or liquid fertilizer might be placed in the space between the wall of the cavity and the flower pot to provide moisture for the plant. The flutes or ribs 17 may also provide for aeration and air circulation around the filled flower pot while it is in storage. This has been found helpful in keeping the plant dry if necessary to prevent growth of fungus. Also, warm air can be circulated in the space if the plant is being stored in an otherwise cold area. Additionally, the flutes provide some reinforcing strength on the cavity walls yet allowing them to retain some degree of resiliency which produces a feature which will be described later.

The outside or outer periphery of the tray can be said to be defined by an outer wall 20 which is generally upright although it may have a slight upward, inward slope. In the outer wall 20 at each cavity 10 a curved cutout 21 is formed. The purpose of cutout 21 is to allow hand access to the flower pot so it can be conveniently removed from the tray when necessary. The size, shape and extent of cutouts 21 is a matter of choice.

Extending outward from the bottom of the outer wall 20 is a horizontal skirt or flange 22 which can be used to grasp and hold the tray. The skirt 22 is elevated a short distance above the bottom 14 of the cavity 10 to provide a space for the fingers to grasp the skirt and lift the tray after the inserted flower pots have been filled with suitable materials. If desired, if the bottom is closed drain holes 25 can be provided in the bottom of the cavity.

Typically, the tray would be used in the following fashion. The flower pots, made of some relatively thin plastic material as mentioned earlier, are initially received from the manufacturer in a shipping carton or container arranged in stacks. If it is assumed for the present discussion that the flower pots are arranged in a shipping carton upside down in six separate stacks, after the carton is opened the tray is inserted through the top opening of the shipping container with the cavity openings facing downward toward the bottoms of the stacked flower pots. The tray can then be lifted out of the container and a flower pot will be resting in each of the cavities so that a layer of six flower pots are removed from the shipping container. It has been found that the flutes 17 serve the function of insuring that only a single pot is extracted each time from the stack. Apparently, when the tray is placed on the stack of flower pots and pressed downward slightly, the ribs 17 act as fingers which grasp the outer surface of the top flower pot in the stack and lifts it individually off the stack leaving the rest of the pots stacked up. It has been found that without these ribs sometimes two or more flower pots are extracted at one time from a stack. As is shown most clearly in FIG. 3, the lower end 17A of the ribs 17 are flattened so that the rib appears to be somewhat bowed. In other words, the upper length 17B of the rib is uniform in thickness along the cavity wall, the inner surface of the rib paralleling the cavity wall. As it nears the bottom, the rib becomes thinner, i.e., the inner surface is flattened so does not parallel the taper of the cavity wall. It has been found that this provides the means whereby only a single flower pot is lifted off a stack at a time by the tray. Without this bow it has been found that oftentimes multiple pots from one stack are carried up in the tray cavity. This is the case with both square and circular flower pots.

After the flower pots have been inserted in the tray, the tray is then placed rightside up on a conveyor belt which carries the tray past mechanized stations or locations where soil, seed, fertilizer, etc. is deposited in each of the flower pots. The cavities of the tray are automatically aligned in their respective rows and columns to make sure that the openings pass directly underneath the various processing or filling stations. After the flower pots have been filled with suitable materials, the tray is grasped by its skirt or flange 22 and removed from the conveyor belt and filled pots are placed in storage or are processed further. Eventually each of the flower pots is removed from the tray by grasping it through the cutout or opening 21 and the tray eventually can be reused. In the meantime the trays can be stacked on one another for storage until they are reused.

It should be noted that the tray closes off the otherwise open area between circular flower pots placed on a conveyor. This then prevents excess materials from falling in large quanitites on the conveyor belt between the flower pots. While there may be some slight amount of material falling on the conveyor belt between trays this normally is not of any great concern. The flower pots with the material contained therein can be stored for significant periods of time in the trays and the flowers or plants can be treated while resting in the trays.

I claim:

1. A loading tray for a plurality of stacks of upside-down, empty, thin-walled, plastic flower pots arranged in preset spaced rows and columns, said tray comprising:

an imperforate, thin and somwhat resilient sheet of relatively stiff plastic formed into a plurality of cavities spaced in rows and columns the same as said stacks of pots, each of said cavities having an open top and inwardly downward tapering inner wall means for grasping a single flower pot from said stacks of pots when the tray is placed upside down over said stacks of upside-down flower pots and pressed onto the stacks of pots and then lifted off the stacks.

2. The tray as described in claim 1 wherein said inner wall means comprises spaced-apart ribs extending downward along at least part of the inner surface of the cavity walls.

3. The tray as described in claim 2 wherein the lower ends of said ribs are flattened.

4. The tray as described in claim 2 wherein said ribs are bowed near their lower ends.

5. The invention as in claim 1 further including a hand-access cutout area in the wall of each cavity for removing the pot resting in the tray cavity.

6. The tray as in claim 5 further including a thin generally upright outer wall around the outer edge of the tray having cutouts corresponding to said hand-access cutouts and being at least in part spaced from the cavity walls whereby one tray is nestable within another tray.

7. The tray as in claim 1 wherein said pots and said cavities are circular.

* * * * *